No. 753,782. Patented March 1, 1904.

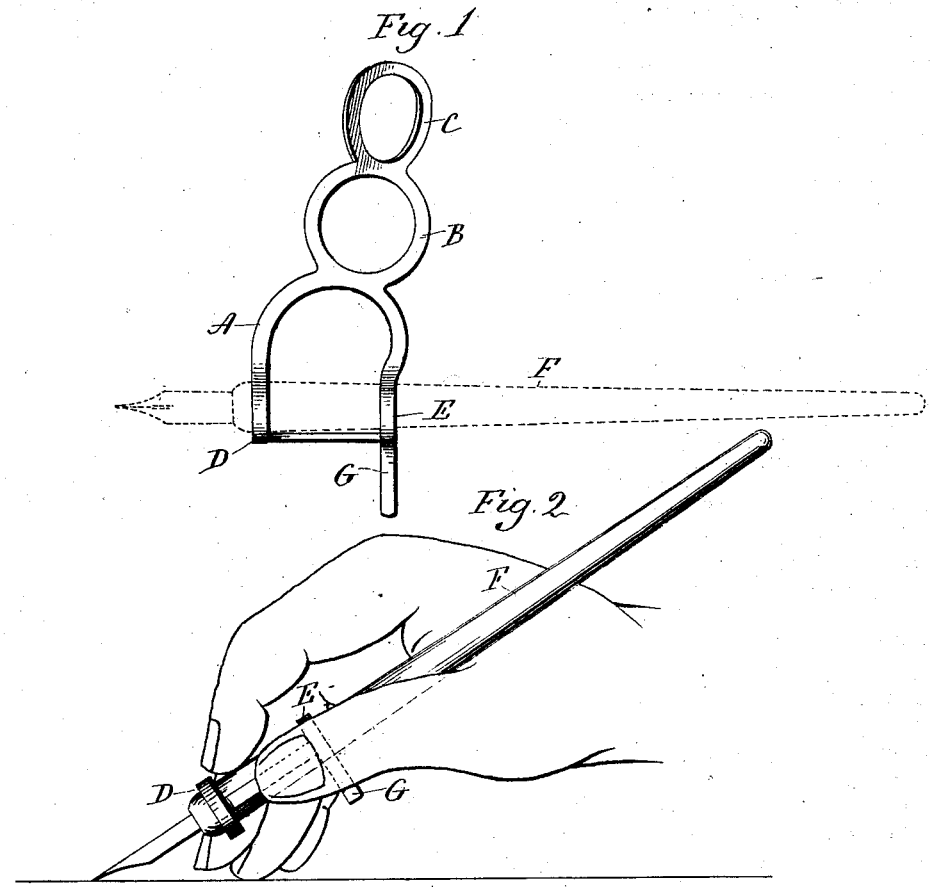

UNITED STATES PATENT OFFICE.

FRANK C. YOUNG, OF NEW HAVEN, CONNECTICUT.

DEVICE FOR TEACHING PENMANSHIP.

SPECIFICATION forming part of Letters Patent No. 753,782, dated March 1, 1904.

Application filed November 2, 1903. Serial No. 179,456. (No model.)

*To all whom it may concern:*

Be it known that I, FRANK C. YOUNG, of New Haven, in the county of New Haven and State of Connecticut, have invented a new and useful Improvement in Devices for Teaching Penmanship; and I do hereby declare the following, when taken in connection with the accompanying drawings and the letters of reference marked thereon, to be a full, clear, and exact description of the same, and which said drawings constitute part of this specification, and represent, in—

Figure 1, a top or plan view of a device for teaching penmanship constructed in accordance with my invention; Fig. 2, a side view of a hand with the fingers supported by my improved device; Fig. 3, a plan view of a modified form which my invention may assume, showing the device formed from wire and without means for supporting a penholder.

This invention relates to an improvement in devices for teaching penmanship with particular reference to a device for holding the fingers in a right position to permit the necessary muscular or arm movement, the object of the invention being the construction of a simple device which may be readily formed from sheet or cast metal or wire; and the invention consists in the construction as hereinafter described, and particularly recited in the claims.

In carrying out my invention I employ loops or rings for the rest or confinement of the middle, third, and little fingers and a support for the thumb. These may be formed from sheet metal or cast, and, as shown in Fig. 1 of the drawings, comprise a ring A for the middle finger, a ring B for the third finger, and a ring C for the little finger. These rings or loops are connected together, and, as shown in this figure, are formed integral with penholder-retainers D E, in which a penholder F is placed and rigidly held. Beyond the penholder is a rest G for the thumb. This support for the thumb may be a simple projection on one side of the holder, or it may be in the form of an eye or loop through which the thumb may pass.

If desired, the penholder-retainers D E may be omitted, as shown in Fig. 3 of the drawings, the holder being held by the fingers in the usual way except that the middle, third, and little fingers will be given the right position, and a support will be provided for the thumb. In this Fig. 3 the device is shown as formed from wire and may be made from a single piece which is bent to form rings A', B', and C' and a loop or support G' for the thumb, these four rings or loops giving the hand the right position, yet permitting the holder to be readily grasped between the thumb, forefinger, and middle finger. The rings or loops for the fingers may be arranged in the same plane or slightly turned with relation to each other.

With a device of this character the fingers are guided or supported in proper position, compelling the writer to use the arm or muscle movements, and provides a support for the fingers and tends to relieve the strain and prevents cramping.

Having fully described my invention, what I claim as new, and desire to secure by Letters Patent, is—

1. A device for teaching penmanship comprising three connected loops or rings to receive the middle, third and little fingers, and a support for the thumb, substantially as described.

2. A device for teaching penmanship, consisting of penholder-retainers adapted to support a penholder, three loops or rings for the support of the middle, third and little fingers arranged at one side of said retainers, and a support for the thumb at the opposite side of said retainers, substantially as described.

In testimony whereof I have signed this specification in the presence of two subscribing witnesses.

FRANK C. YOUNG.

Witnesses:
 FREDERIC C. EARLE,
 CLARA L. WEED.